(No Model.)  2 Sheets—Sheet 1.

H. T. HUNT.
SAND PUMP REEL.

No. 264,083. Patented Sept. 12, 1882.

Witnesses
Jno. K. Smith
L. C. Fitler.

Inventor
Hosea T. Hunt
by his Attys
Bakewell & Kerr (No Model.)  H. T. HUNT.  2 Sheets—Sheet 2.
SAND PUMP REEL.
No. 264,083.  Patented Sept. 12, 1882.
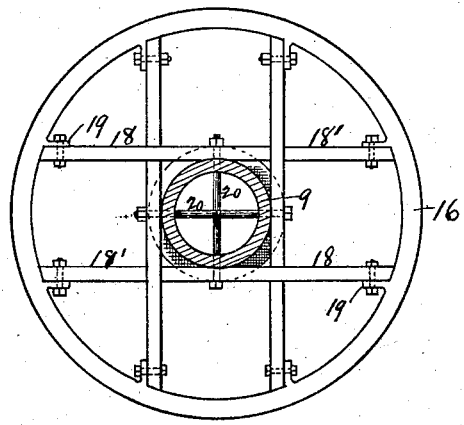
Fig. 3.
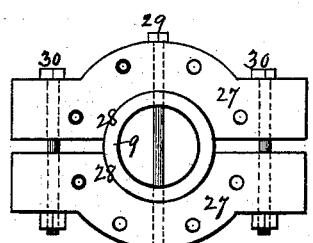
Fig. 4.
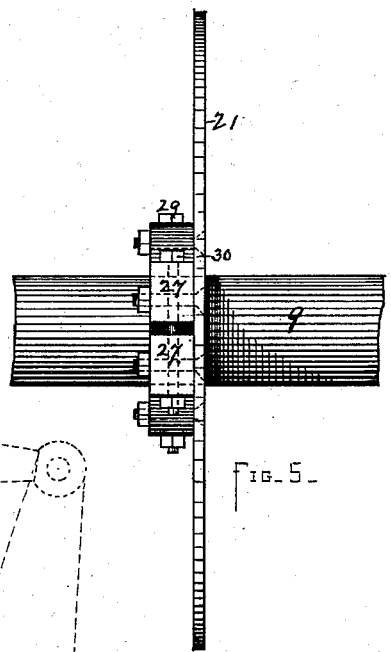
Fig. 5.
Fig. 6.
Witnesses
Jno. K. Smith
L. C. Fitler
Inventor
Hosea T. Hunt
by his Attys
Bakewell & Kerr

UNITED STATES PATENT OFFICE.

HOSEA T. HUNT, OF TITUSVILLE, PENNSYLVANIA.

SAND-PUMP REEL.

SPECIFICATION forming part of Letters Patent No. 264,083, dated September 12, 1882.

Application filed October 24, 1881. (No model.)

*To all whom it may concern:*

Be it known that I, HOSEA T. HUNT, of Titusville, in the county of Crawford and State of Pennsylvania, have invented a new and useful Improvement in Sand-Pump Reels; and I do hereby declare the following to be a full, clear, and exact description thereof.

As heretofore usually made the reel-shaft of sand-pump reels has been extended outward from the main sill over the sub-sill that supports the band-wheel and reel of the oil-well derrick. The main sill extended from the middle of the side of the derrick, and the extension of the reel from that point outward threw it to the side of the derrick and caused the reeling to be done at an angle, which caused a great loss of power. A bevel-pulley was generally used to bring the shaft around at right angles to the rope, so as to enable the rope in reeling to coil or advance along the shaft. The objections to this reel are overcome in my improved construction, in which the reel is arranged at the outer side of the band-wheel, and one end of it is journaled in a knuckle-post on the sub-sill, by means of which the reel is thrown into and out of contact with the band-wheel. The reel-shaft extends inward over the main sill, and may be journaled either at or beyond it. This brings the reel opposite or nearly opposite the middle of the side of the derrick and enables me to reel directly instead of at an angle. The direct reeling effects a saving of fifty per cent. of the power necessary with a beveled pulley. In an oil-well rig the main sill supports the samson-post of the walking-beam and the inner end of its crank-shaft, the outer end being journaled on the sub-sill. The band-wheel which turns the crank-shaft is between the sills.

To enable others skilled in the art to make and use my invention, I will now proceed to describe it by reference to the accompanying drawings, in which—

Figure 1:
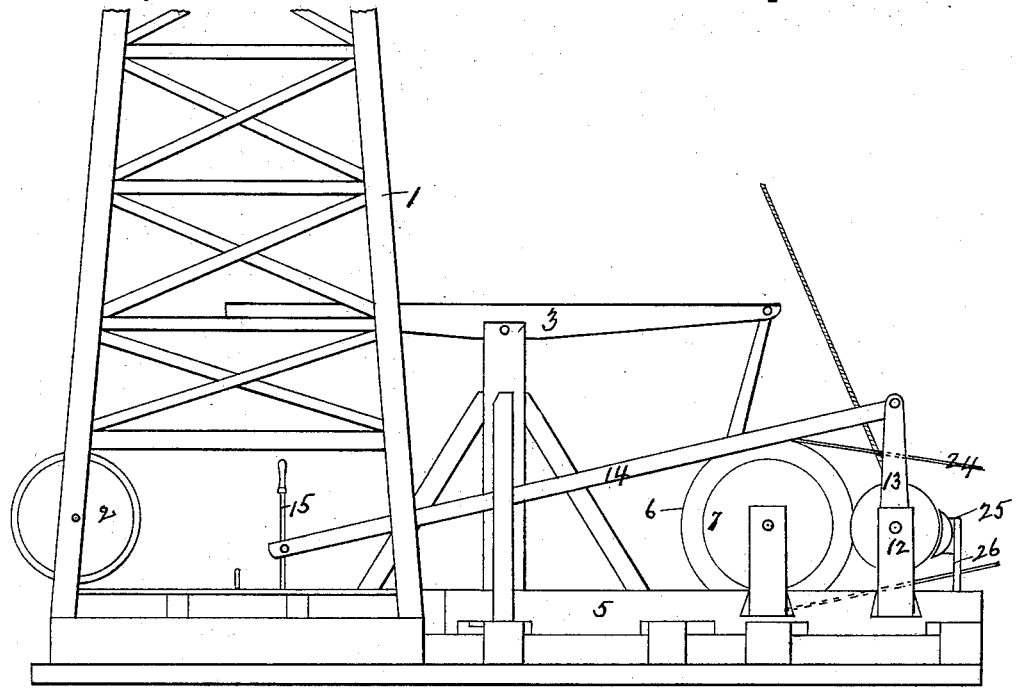
Figure 2:
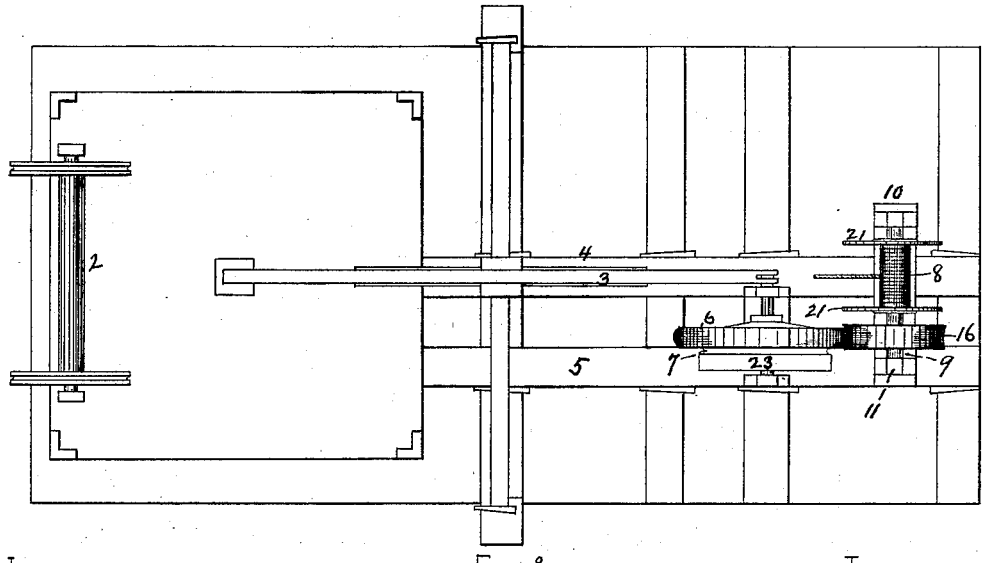

Figure 1 is a side elevation of a derrick provided with my improvement. Fig. 2 is a plan view of the reel and adjacent parts. Figs. 3, 4, 5, and 6 are details of construction.

Like letters of reference indicate like parts in each.

The derrick 1 is of the ordinary construction, and is provided with the usual bull-wheel, 2, walking-beam 3, sills 4 and 5, band-wheel 6, and tug-pulley 7. The band-wheel has a square or slightly-convex face. Outside of the band-wheel is the reel 8, the shaft 9 of which is journaled in bearings 10 and 11. The outer bearing is composed of a knuckle-post, 12, mortised in the sub-sill 5, and a lever 13, and the reel-shaft 9 is journaled in the lever. The lever is pivoted at one end in the knuckle-post 12, and the other end is pivoted to a rod or bar, 14, which extends to and is pivoted to an operating-lever, 15. The purpose of this construction is to enable the reel-pulley 16, which is mounted on the shaft 9, to have sufficient motion to throw it into or out of contact with the face of the band-wheel 6. The other end of the shaft is journaled in a stationary bearing in the post 10, which may either be mortised in the main sill or be placed beyond it, as shown in Fig. 2. The shaft 9 is preferably a hollow iron shaft, and the reel-pulley 16 is preferably made with an iron rim, 21, and wooden spokes 18 and 18', which are fastened to the rim by bolts through metallic lugs 19, integral with or riveted to the rim, and to the shaft 9 by bolts 20, extending through the shaft and the inner ends of the spokes 18, such inner ends lying across and against the shaft. The spokes 18 are the main spokes and 18' the brace-spokes, which extend from the main spokes to the rim. The reeling is done on that part of the shaft which is between the flanges 21, which are held in place by collars on the shaft, or by the means shown in Figs. 4 and 5, in which are shown two wooden blocks, 27, hollowed out at 28, but not enough to let them meet around the shaft. This is to allow them to clamp on the shaft. A bolt, 29, passes through the shaft 9 and the blocks, and other bolts, 30, pass through the ends of the blocks and clamp them firmly on the shaft. Then the flanges 21 are placed against the blocks and bolted to them. In this way I get a strong, cheap, and firm fastening for securing the flanges to the shaft.

The band-wheel 6, in addition to the tug-pulley 7, may also be provided with a square or slightly-convex-faced pulley, 23, at the side, against which the reel-pulley 16 may be caused to bear, if for any reason it is not desired to operate it by the band-wheel.

The reel-pulley may, if desired, be a solid wheel, either of wood or metal, and be fastened to the shaft 9 by the bolts 20, passing through flanges either bolted or cast thereon.

I prefer to use the reel on the outer side of the band-wheel, as shown in the drawings; but it may, if desired, be used on the inner side. In that case the operation of the lever 15 would push it against the band-wheel, while in the preferred form it is pulled against it. When on the outer side the reel is more accessible, can be operated by the band-wheel, and can be extended over or beyond the main sill; but when placed inside it cannot be so extended and must be operated by the pulley 23, because otherwise it would have to bear on the band 24, and would abrade or cut it. The band 24 extends from the engine and drives the entire rig.

The advantages of the metal-faced reel-pulley are that it is more durable than the wooden pulley, and that it does not wear the face of the wooden band-wheel, and does not make it rough or uneven. Heretofore wooden pulleys have been used, and the friction is so great that the pulleys wear out very rapidly—as many as three or four pulleys often wearing out in putting down one deep well. The wearing rough of the band-wheel causes it to cut the band and wear it away also. The friction upon the wheels is a rubbing one, and the power is so great that the wheels wear very rapidly.

At the face of the reel-pulley I put a brake composed of a cast-iron shoe, 25, mounted on a bar, 26, or other convenient place. Upon the retraction of the pulley from the band-wheel it comes against the brake and is checked or stopped thereby. This brake is used in unreeling to control the reel. The power required for this purpose is nearly as great as that required when pumping. Heretofore wooden brakes have been used with the wooden pulleys; but such brakes will not operate satisfactorily with the iron pulley, and hence I have devised this brake. My improved brake may also be used to advantage with the wooden pulley.

The main advantage of having the knuckle-post on the sub-sill is that it brings the reel more nearly square and enables me to extend it over the main sill any desired distance. Any extension beyond the space between the sills brings the reel more nearly to the center. Such extension of course requires the stationary bearing-post 10 to be moved outward from the main sill. If this extension is equal to that portion of the reel that is between the two sills, the reel will be exactly centered and will wind squarely. An advantage of extending the reel in length is that the coil is not so deep as on a short reel, and runs more evenly, and consequently requires less power to operate. Hence I can reduce the size of my reel-pulley, and thereby effect a saving in both power and cost. These advantages are due to using the reel on the outside, so that the rope passes over the walking-beam, and to placing the knuckle-post on the sub-sill. It is apparent that if the knuckle-post were on the main sill any extension of the reel would simply throw it more out of center. By the use of the hollow shaft I effect a great saving in cost and am enabled to lighten the rig, which is an advantage, as it enables it to be handled, used, and transported with more ease, and a light construction having the requisite strength is in demand among oil-operators. I use ordinary tubing cut to suitable lengths. A great advantage of this hollow shaft is that I can bolt through it to fasten the reel-flanges and pulley on it, and thereby obtain a very secure and cheap fastening. The formation of the reel-pulley with the lugs 19 extending from the metallic rim enables me to make a very light and strong pulley, and affords an easy and cheap means of fastening the spokes to the rim. The band-wheel is slightly convex to enable the easy shipping and unshipping of the band 24. The formation of the pulley with a corresponding concave rim gives the pulley a better hold on the band-wheel and saves power.

What I claim as my invention, and desire to secure by Letters Patent, is—

1. A sand-pump reel the movable end of which is journaled at the sub-sill, and which extends toward or over the main sill, substantially as and for the purposes described.

2. A sand-pump reel the movable end of which is journaled at the sub-sill, and which is arranged on the outer side of and to operate in connection with the band-wheel, substantially as and for the purposes described.

3. A sand-pump reel the movable end of which is journaled in a knuckle bearing on the sub-sill, and which extends inward to the main sill, substantially as and for the purposes described.

4. A sand-pump reel having a hollow shaft to which the pulley or other part is secured by bolts extending laterally through it, substantially as and for the purposes described.

5. A sand-pump reel having side flanges secured to the shaft by bolting to wooden blocks clamped around the shaft, substantially as and for the purpose described.

6. A sand-pump-reel pulley having wooden arms and a metallic rim, and with the arms fastened to metallic lugs on the inside of the rim, substantially as and for the purpose described.

In testimony whereof I have hereunto set my hand.

HOSEA T. HUNT.

Witnesses:
T. B. KERR,
JAMES H. PORTE.